(12) United States Patent
Kawaguchi et al.

(10) Patent No.: US 6,283,602 B1
(45) Date of Patent: *Sep. 4, 2001

(54) LIGHTING DEVICE, LIQUID CRYSTAL DISPLAY UNIT, AND ELECTRONIC EQUIPMENT

(75) Inventors: Yoshito Kawaguchi; Shigeo Kobayashi, both of Nagano (JP)

(73) Assignee: Seiko Epson Corporation (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/042,869

(22) Filed: Mar. 17, 1998

(30) Foreign Application Priority Data

Mar. 18, 1997 (JP) .................................... 9-065164

(51) Int. Cl.⁷ ........................................ F21V 8/00
(52) U.S. Cl. .................. 362/31; 362/26; 362/27
(58) Field of Search ................ 362/26, 27, 30, 362/31, 327, 328, 330, 339; 385/146; 349/65

(56) References Cited

U.S. PATENT DOCUMENTS 3,740,540 * 6/1973 Takeichi et al. ................ 362/27
5,375,043 12/1994 Tokunaga .
5,506,929 * 4/1996 Tai et al. ....................... 385/146
5,915,855 * 6/1999 Murase et al. ................. 362/26

FOREIGN PATENT DOCUMENTS

| 4329914 A1 | 3/1995 | (DE) . |
| 0560605 A1 | 9/1993 | (EP) . |
| 0751340 A3 | 1/1997 | (EP) . |
| 0800036 A1 | 10/1997 | (EP) . |
| WO 96/17207 | 6/1996 | (WO) . |

* cited by examiner

Primary Examiner—Y. Quach
(74) Attorney, Agent, or Firm—Harness, Dickey & Pierce, P.L.C.

(57) ABSTRACT

In a lighting device in which planar light is emitted from the planar light emitting surface of a light guide by using a point-source light, such as an LED, the emitted light having a uniform luminance level is obtained on the overall light emitting surface. The lighting device has a point-source light 18 for emitting light in a point-like form. A planar light guide 16 radiates light in a planar form from the planar light emitting surface 16a. A linear light guide 19 is disposed between the point-source light 18 and the planar light guide 16. The point-like light emitted from the point-source light 18 is converted into linear light by the linear light guide 19, and the linear light is guided into the planar light guide 16 through the light incident surface 16b. Since the linear light is incident on the planar light guide 16, the light having a uniform luminance level can be obtained on the overall light emitting surface 16a.

8 Claims, 8 Drawing Sheets

LIGHTING DEVICE, LIQUID CRYSTAL DISPLAY UNIT, AND ELECTRONIC EQUIPMENT

BACKGROUND OF THE INVENTION

1. Technical Field

The present invention relates to a lighting device using a light guide. The invention is also concerned with a liquid crystal display unit using the above type of lighting device. The invention further pertains to electronic equipment using the above type of liquid crystal display unit.

2. Discussion

Liquid crystal display units are being widely used as visible information displays for various types of electronic equipment, such as mobile cellular telephones, video cameras, etc. In this type of liquid crystal display unit, the orientations of liquid crystals are controlled to modulate light, thereby displaying characters, numbers, and other visible information. The liquid crystal display unit is generally formed in the following manner. A driver IC is attached to a liquid crystal panel so as to form a liquid crystal module. Further, a lighting device and a reflector are fixed to the liquid crystal module.

Hitherto, as the foregoing lighting device, the lighting device shown in FIG. 10 is known which has a planar light guide 101 and point-source lights 102 which are positioned to face a light incident surface 101a of the light guide 101. In this conventional device, the light emitted from the point-source lights 102 is diverged by lenses 103, respectively, and the diverged light then radiates in a planar form from a light emitting surface 101b of the light guide 101.

In the above known type of lighting device, however, the area in which the light emitted from the point-source lights 102 can be guided is restricted to predetermined angular areas A. A sufficient luminance level of light can be obtained in the areas A, but not in the portions outside the areas A. As a result, the overall light emitting surface 101b cannot emit light with a uniform luminance level.

In view of the above problem, it is an object of the present invention to provide a lighting device in which the light having a uniform luminance level can emit from the overall planar light emitting surface of a light guide when the light is applied to the light guide from point-source lights.

SUMMARY OF THE INVENTION

In order to achieve the above object, according to one aspect of the present invention, there is provided a lighting device comprising a point-source light for emitting light in a point-like form, and a planar light guide for guiding the light from the point-source light and radiating the guided light from a planar light emitting surface in a planar form, the lighting device being characterized in that a linear light guide is disposed between the point-source light and the planar light guide so as to convert the light from the point-source light into linear light and radiate the linear light to the planar light guide. According to this lighting device, since the linear light rather than the point-like light is incident on the light incident surface of the planar light guide, the light having a uniform luminance level can be obtained on the overall planar light emitting surface of the planar light guide.

With the above configuration, the linear light guide and the planar light guide may be separately formed, and then, the light emitting surface of the linear light guide and the light incident surface of the planar light guide may be brought into contact with each other. Alternatively, the linear light guide and the planar light guide may be integrally formed of the same member. In this case, one cross-sectional surface of the same member may potentially be used as both the light emitting surface of the linear light guide and the light incident surface of the planar light guide.

In the foregoing configuration, the linear light guide may be formed in a rod-like shape provided with a light emitting surface in a position opposedly facing a light incident surface of the planar light guide. At this time, the point-source light may be positioned to opposedly face at least one of the lateral surfaces adjacent to the light emitting surface of the linear light guide. Moreover, a light reflecting member for guiding the light from the point-source light to the light emitting surface of the linear light guide may be provided on a surface other than the light emitting surface of the linear light guide. The light reflecting member may be formed of any one of, for example, a prism, a dot pattern having a light reflecting color, and a light reflecting sheet. The light reflecting color is generally white, but may be another color as long as it can reflect the light.

If the light reflecting member is provided for the linear light guide, the surface on which the light reflecting member is disposed may be preferably inclined in a direction toward the point-source light. It is thus possible to efficiently guide the light radiated from the point-source light to the planar light guide.

According to another aspect of the present invention, there is provided a liquid crystal display unit comprising a liquid crystal panel and a lighting device attached to the liquid crystal panel. The lighting device has a point-source light for emitting light in a point-like form, and a planar light guide for guiding the light from the point-source light and radiating the guided light from a planar light emitting surface in a planar form. A linear light guide is disposed between the point-source light and the planar light guide so as to convert the light from the point-source light into linear light and radiate the linear light to the planar light guide. In the liquid crystal display unit, as well as the foregoing lighting device, the linear light rather than the point-like light is incident on the light incident surface of the planar light guide, thereby making it possible to obtain the light having a uniform luminance level on the overall planar light emitting surface of the planar light guide.

According to a further aspect of the present invention, there is provided electronic equipment comprising the foregoing liquid crystal display unit. The electronic equipment includes at least the above liquid crystal display unit, a power supply unit for supplying power to the liquid crystal display unit, and a controller for controlling the operation of the liquid crystal display unit. Various types of electronic equipment, for example, mobile cellular telephones and video cameras, may be considered.

DETAILED DESCRIPTION OF THE PREFERRED EMBODIMENTS

Figure 1:
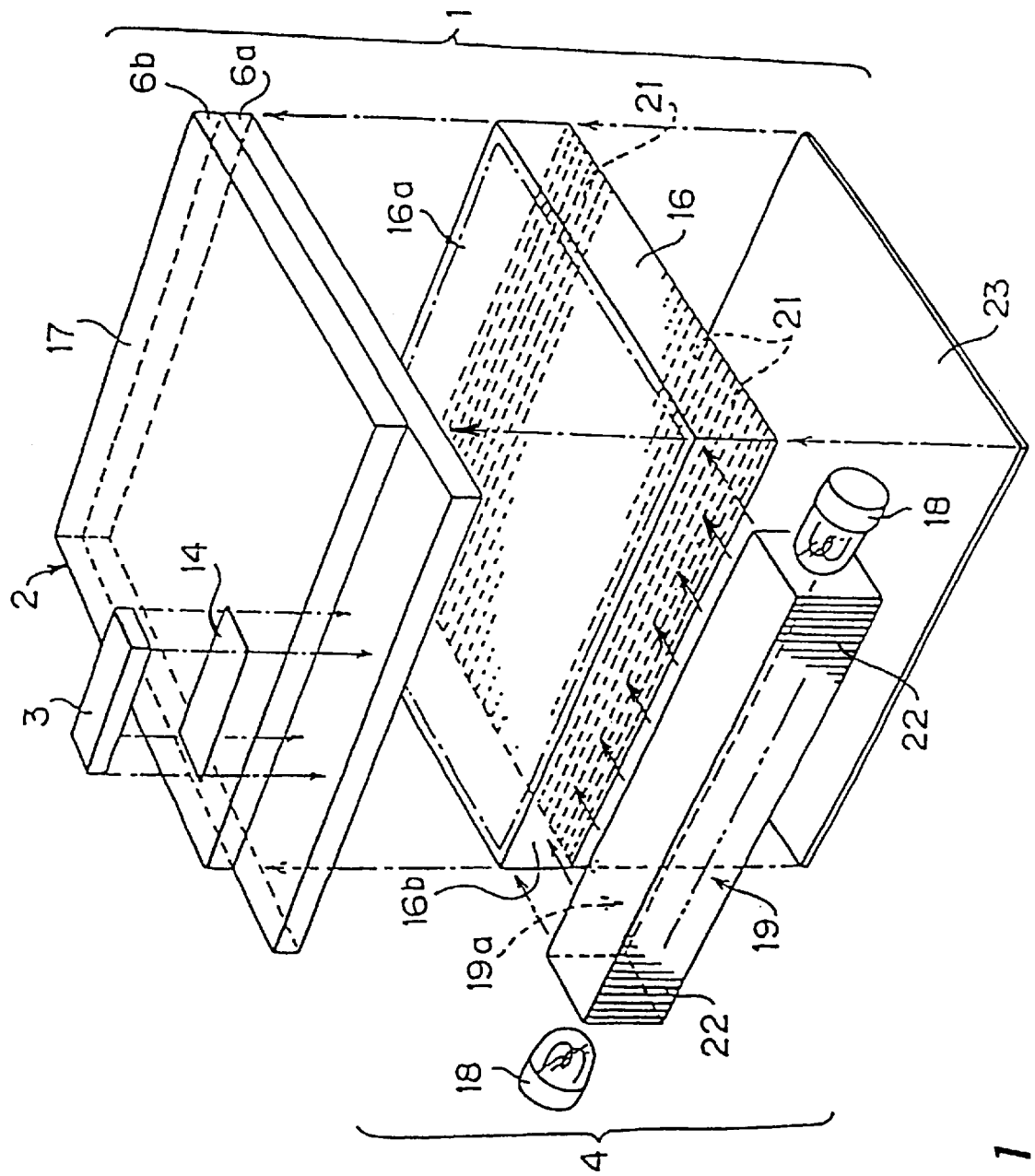
FIG. 1 is an exploded perspective view illustrating an embodiment of a lighting device and an embodiment of a liquid crystal display unit according to the present invention.
Figure 2:
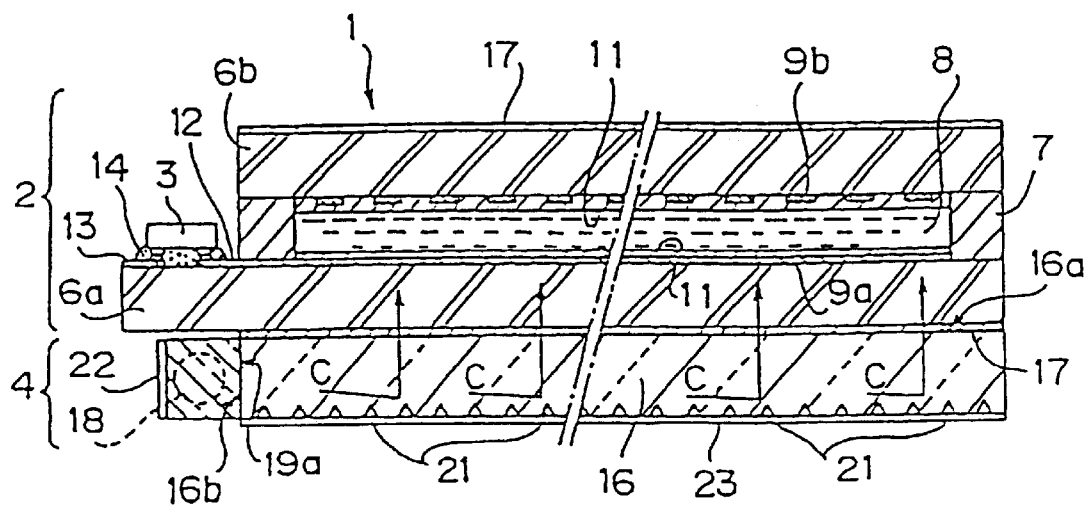
FIG. 2 is a sectional view illustrating the sectional structure as viewed from the lateral surface of the liquid crystal display unit shown in FIG. 1.

FIG. 1 illustrates an embodiment of a lighting device and an embodiment of a liquid crystal display unit according to the present invention. In FIG. 1, a liquid crystal display unit 1 is formed by attaching a driver IC 3 and a lighting device 4 to a liquid crystal panel 2. The liquid crystal panel 2 has, as shown in FIG. 2, a pair of transparent substrates 6a and 6b opposedly facing each other. A transparent electrode 9a made from ITO (Indium Tin Oxide) is formed on the surface of one transparent substrate 6a. The transparent electrode 9a includes at least a striped electrode which is formed by arranging a plurality of linear electrodes parallel to each other. The transparent electrode 9a may sometimes include a suitably patterned electrode. An alignment layer 11 is disposed on the transparent electrode 9a and then undergoes an alignment operation, for example, a rubbing operation.

Formed on the other transparent substrate 6b is an ITO-made transparent electrode 9b which includes at least a striped electrode and may include a patterned electrode. An alignment layer 11 is also disposed on the transparent electrode 9b and is further aligned.

The transparent substrates 6a and 6b are overlaid on each other in such a manner that the transparent electrodes 9a and 9b opposedly face each other, in particular, the striped electrodes are positioned orthogonal to each other. The transparent substrates 6a and 6b are then bonded to each other with a sealing material 7 therebetween so as to form a suitable gap, i.e., a cell gap, between the substrates 6a and 6b. Then, a liquid crystal 8 is sealed inside the cell gap. Polarizers 17 are attached to the outer surfaces of the respective transparent substrates 6a and 6b.

The transparent electrode 6a extends off the transparent electrode 6b, and a connecting conductive terminal 12 is formed on the extended portion. The connecting conductive terminal 12 has two terminal portions: one terminal portion is integrally formed with the transparent electrode 9a, while the other terminal portion is connected to the transparent electrode 9b formed on the transparent substrate 6b with a conducting material (not shown) provided between the transparent substrates 6a and 6b. Also formed on the end of the extended portion of the transparent substrate 6a is an external connecting conductive terminal 13 for establishing a conduction with an external circuit.

The driver IC 3 is fixed to the liquid crystal panel 2 configured as described above in the following manner. As illustrated in FIG. 2, projecting electrodes, i.e., bumps, of the driver IC 3 are brought into contact with the connecting conductive terminal 12 and the external connecting conductive terminal 13, respectively, with intervening ACF (Anisotropic Conductive Film) 14. Then, the driver IC 3 is pressurized by heating, thereby bonding the driver IC 3 to the transparent substrate 6a.

In this embodiment, the lighting device 4 is bonded to the outer surface of the transparent substrate 6a by using double-sided adhesive tape or other adhesive means. The lighting device 4 has, as shown in FIG. 1, two tungsten lamps 18 serving as point-source lights, a planar light guide 16 provided with a light incident surface 16b and a planar light emitting surface 16a, and a linear light guide 19 disposed between the lamps 18 and the planar light guide 16. The planar light guide 16 and the linear light guide 19 are formed from, for example, an acrylic, polycarbonate, or glass fiber material.

A plurality of linear prisms 21 are formed on the surface of the planar light guide 16 opposite to the light emitting surface 16a and is formed in a striped shape parallel to the axis of the linear light guide 19. The prisms 21 are formed, as shown in FIG. 2, by providing linear recessed portions having a triangular shape in cross section on the surface of the planar light guide 16. A light reflecting sheet 23 is attached to the surface on which the prisms 21 are formed.

Figure 3:
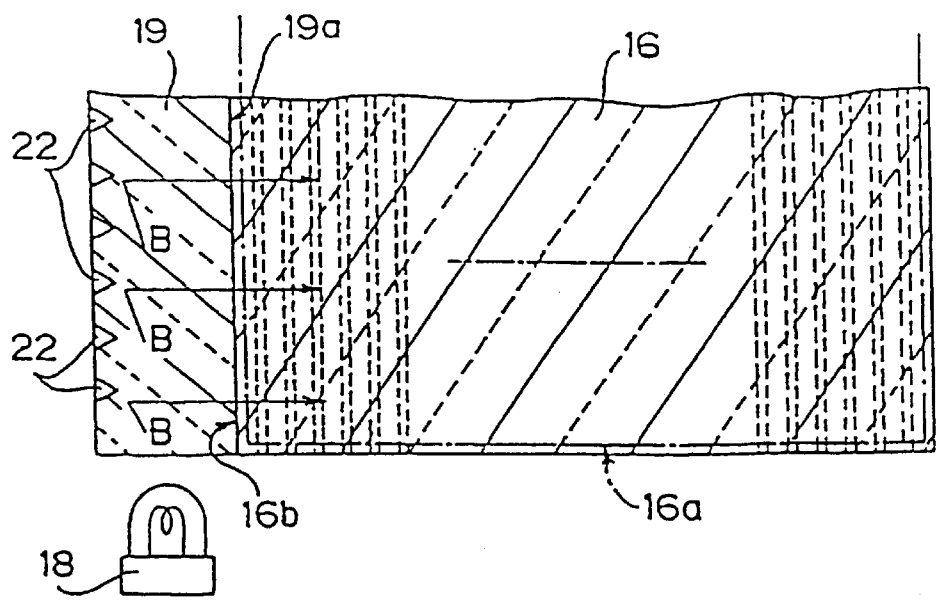
FIG. 3 is a sectional view illustrating part of the sectional structure as viewed from the top of the liquid crystal display unit shown in FIG. 2.

In FIG. 1, the linear light guide 19 is formed in a quadrilateral-prism rod-like shape. Among the lateral surfaces of the linear light guide 19, the surface facing the light incident surface 16b of the planar light guide 16 is used as a light emitting surface 19a. Formed on the lateral surface opposite to the light emitting surface 19a are a plurality of linear prisms 22 in a striped shape, which serve as a light reflecting member, in the direction orthogonal to the axis of the linear prisms 22. The prisms 22, as well as the prisms 21, are formed, as shown in FIG. 3, by providing linear recessed portions having a triangular shape in cross section on the lateral surface of the linear light guide 19.

The linear light guide 19 and the planar light guide 16 are disposed in a predetermined position of the liquid crystal panel 2 in a state in which the light emitting surface 19a of the linear light guide 19 and the light incident surface 16b of the planar light guide 16 are brought into contact with each other. It is preferable that an adhesive does not intervene between the light emitting surface 19a of the linear light guide 19 and the light incident surface 16b of the planar light guide 16 when they are in planar-contact with each other. The lamps 18 are positioned to face the respective edge surfaces adjacent to the light emitting surface 19a of the linear light guide 19.

In the lighting device and the liquid crystal display unit of this embodiment constructed as described above, the lamps 18 emit light in a point-like form by current supply, and the emitted light is guided into the linear light guide 19 through its edge surfaces. The guided light is then reflected by the prisms 22, as indicated by the arrows B of FIG. 3, while travelling within the linear light guide 19, and is linearly emitted from the light emitting surface 19a. The light is further guided into the planar light guide 16 through the light incident surface 16b.

The linear light guided into the planar light guide 16 is reflected by the prisms 21, as indicated by the arrows C of FIG. 2, while travelling within the planar light guide 16, and is then emitted in a planar form from the light emitting surface 16a. In this embodiment, since the light guided into the planar light guide 16 is not point-like light but linear light, the overall light emitting surface 16a is able to emit planar light at a uniform luminance level.

During the above light emitting operation, the required transparent electrodes 9a and 9b are selected by the driver IC 3 and a voltage is applied to the selected electrodes 9a and 9b. Accordingly, the orientations of the liquid crystals corresponding to the selected electrodes are changed from the initial state. The light radiated from the lighting device 4 in the manner described above is modulated in accordance with changes in the orientations of the liquid crystals. As a consequence, the modulated light is recognized as visible information through the polarizer 17 shown in the upper parts of FIGS. 1 and 2. According to the above description, in this embodiment, the light having a uniform luminance level can be radiated from the overall light emitting surface 16a of the planar light guide 16, thereby making it possible to obtain a visible image having a uniform brightness level within the display surface of the liquid crystal panel 2.

Figure 4:
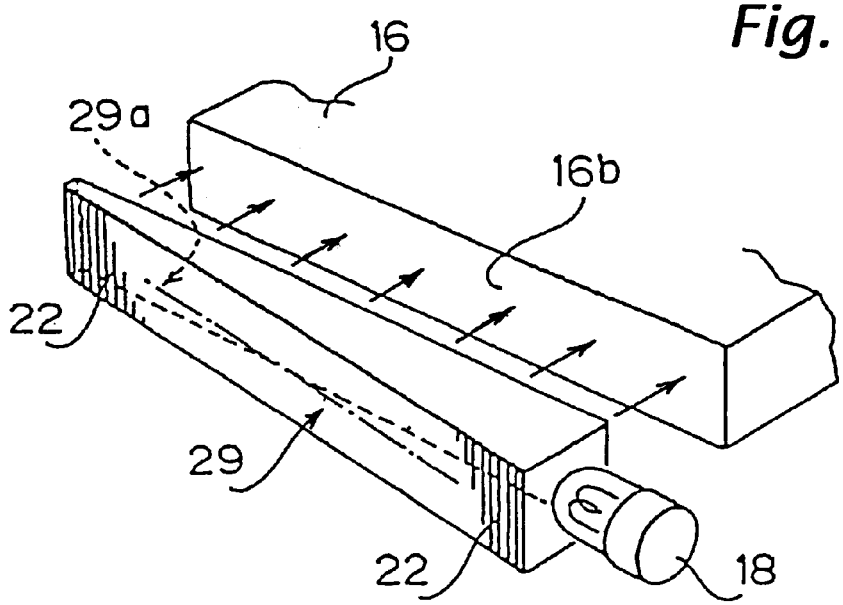
FIG. 4 is a perspective view illustrating another embodiment of the linear light guide.

FIG. 4 illustrates an example of modifications made to the linear light guide. A linear light guide 29 shown in FIG. 4 differs from the linear light guide 19 shown in FIG. 1 in that (1) only one tungsten lamp 18 is provided at one end of the linear light guide 29, and (2) the surface on which the prisms 22 are formed opposite to the light emitting surface 29a is inclined toward the tungsten lamp 18. According to this embodiment, since the light emitted from the lamp 18 can be efficiently guided to the prisms 22, the linearly emitted light having a sufficient level of luminance can be obtained with only one lamp 18.

Figure 5:
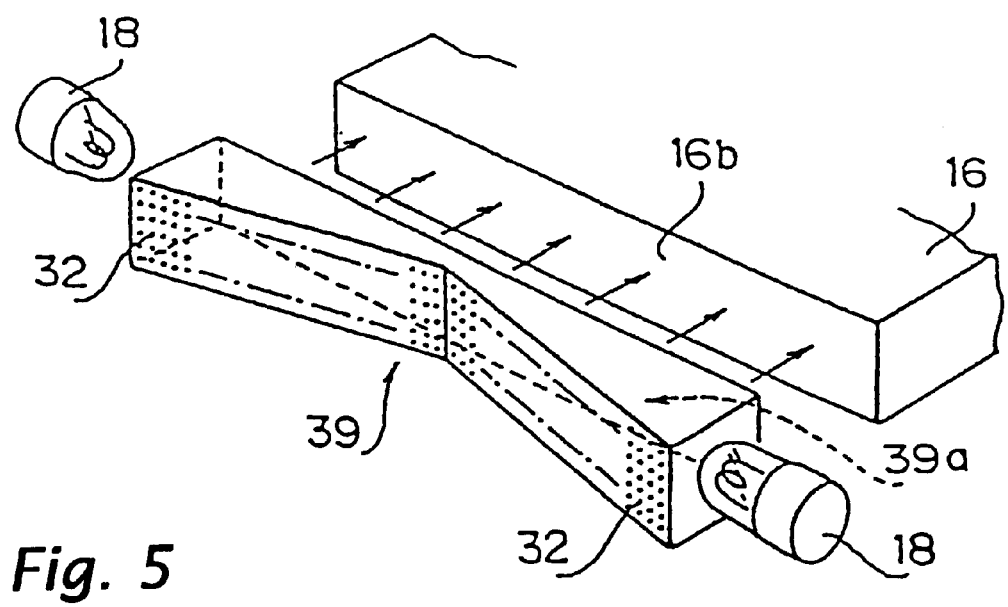
FIG. 5 is a perspective view illustrating still another embodiment of the linear light guide.

FIG. 5 illustrates another example of modifications made to the linear light guide. A linear light guide 39 shown in FIG. 5 is different from the linear light guide 19 shown in FIG. 1 in that (1) white-color dot patterns 32 are used in place of the prisms 22 (FIG. 1) as a light reflecting member for reflecting the point-like light emitted from the lamp 18, and (2) the surface of the linear light guide 39 on which the white-color dot patterns 32 are provided is inclined in different directions with respect to the center of the linear light guide 39 in order to allow the surface provided with the white-color dot patterns 32 to face the individual lamps 18. According to this linear light guide 39, the light from the individual lamps 18 is reflected by the white-color dot patterns 32 and is emitted from the light emitting surface 39a as linear light.

Figure 6:
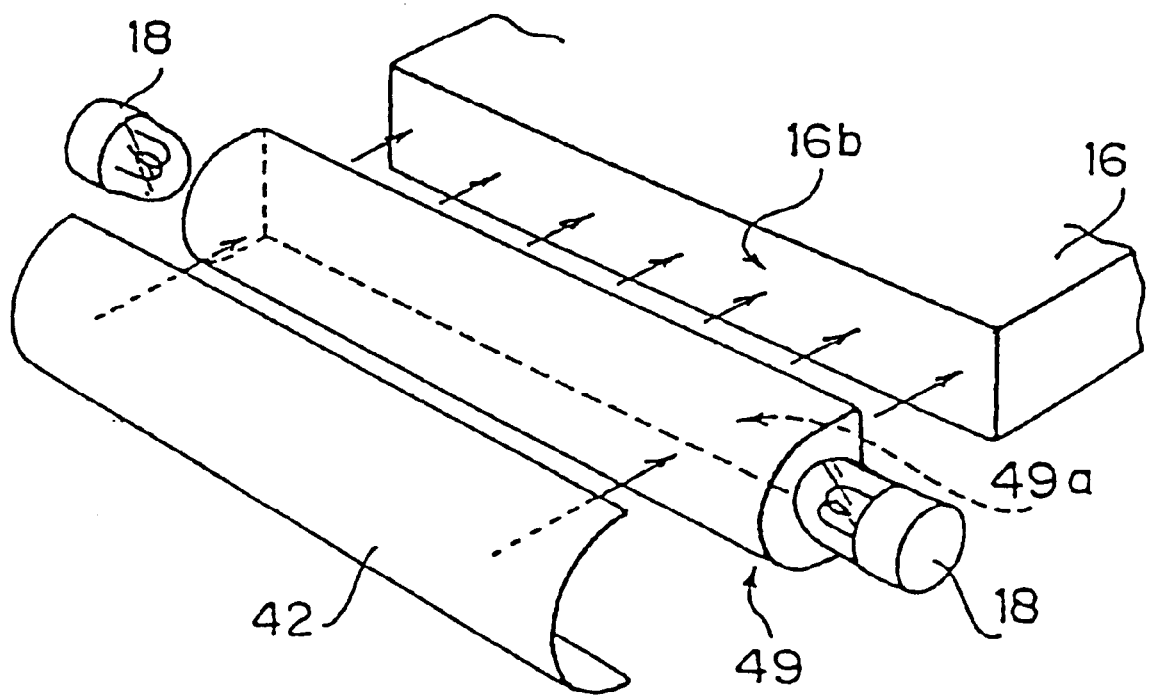
FIG. 6 is a perspective view illustrating a further embodiment of the linear light guide.

FIG. 6 illustrates a further example of modifications made to the linear light guide. A linear light guide 49 shown in FIG. 6 differs from the linear light guide 19 shown in FIG. 1 in that (1) a light reflecting sheet 42 is used instead of the prisms 22 (FIG. 1) as a light reflecting member for reflecting the point-like light emitted from the lamps 18, and (2) the portion of the linear light guide 49 to be attached to the light reflecting sheet 42 is formed in a tubular shape.

It should be noted that any of the light reflecting members, such as the prisms 22, the white-color dot patterns 32, or the light reflecting sheet 42, may be used interchangeably with the linear light guides 19, 29, 39 and 49 illustrated in FIGS. 1, 4, 5 and 6, respectively.

Figure 7:
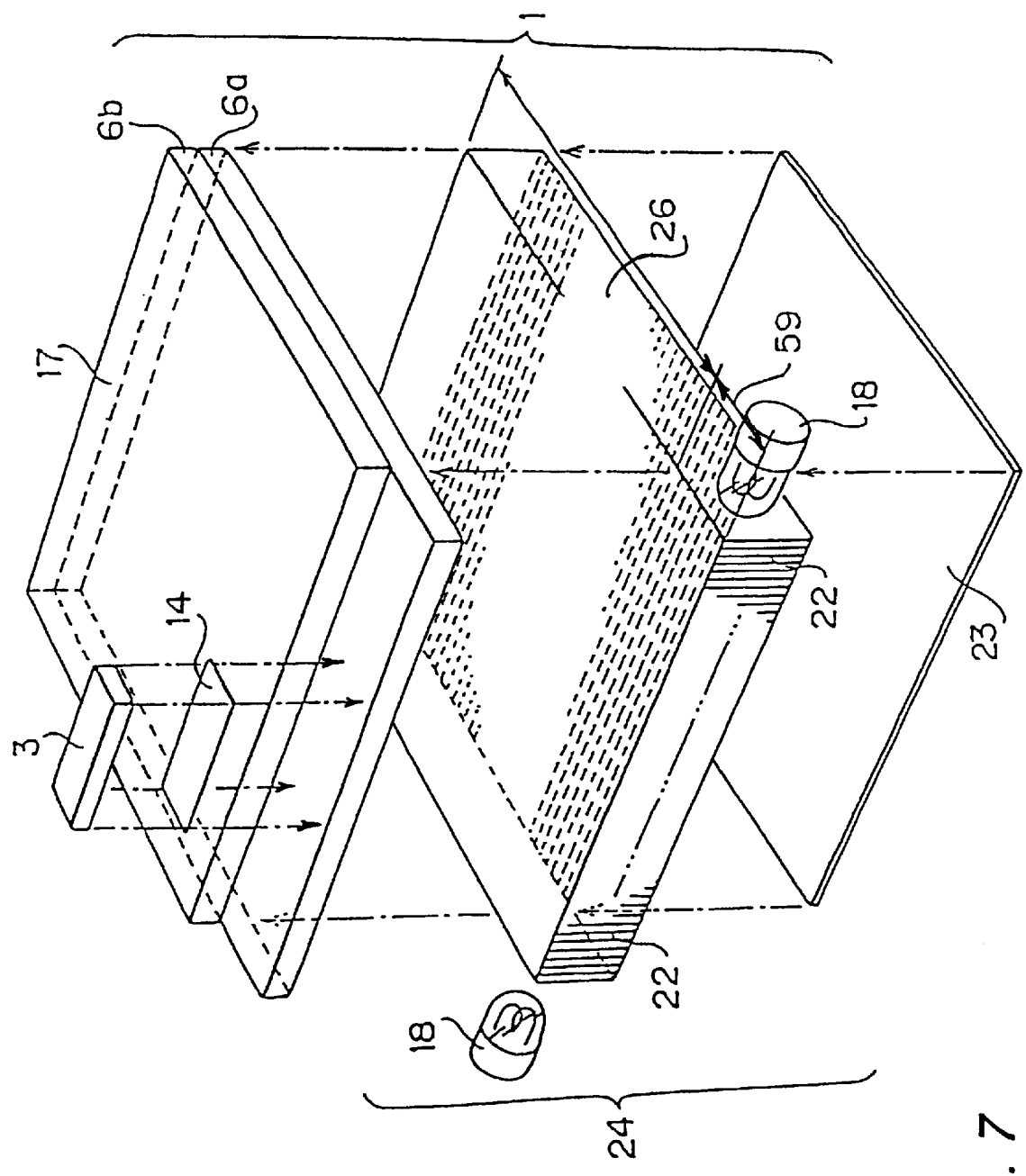
FIG. 7 is a perspective view illustrating another embodiment of a lighting device according to the present invention.

FIG. 7 illustrates another embodiment of a lighting device according to the present invention. In the lighting device 4 shown in FIG. 1, the linear light guide 19 and the planar light guide 16 are separately formed and are then integrated with each other. In contrast, in the lighting device 24 of this embodiment illustrated in FIG. 7, a linear light guide 59 and a planar light guide 26 are integrally formed in advance with the same member. In this embodiment, one cross-sectional surface within the light guide member including the linear light guide 59 and the planar light guide 26 may potentially be used as both the light emitting surface of the linear light guide 19 and the light incident surface of the planar light guide 26.

Figure 8:
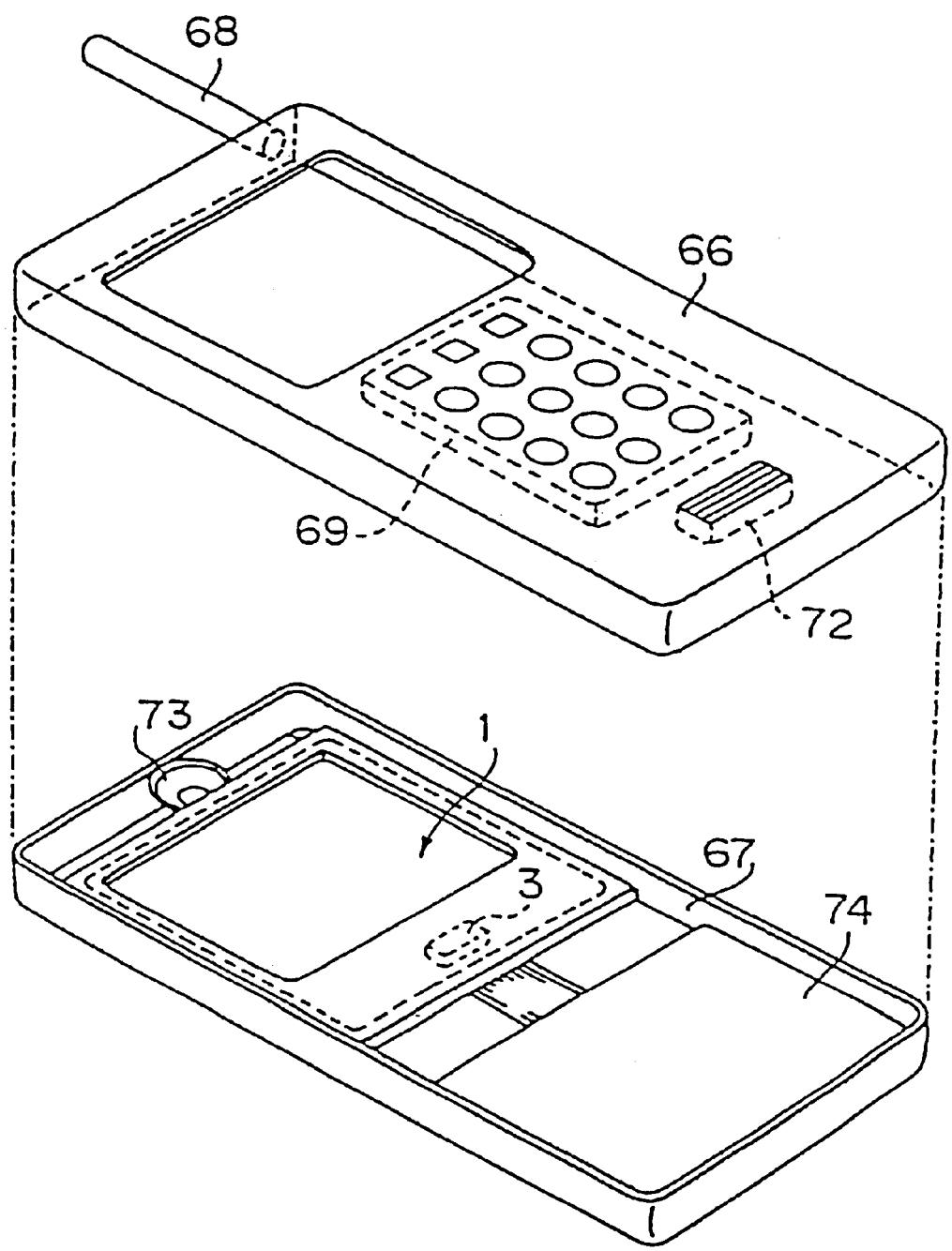
FIG. 8 is an exploded perspective view illustrating an embodiment of electronic equipment according to the present invention.

FIG. 8 illustrates an embodiment of a liquid crystal display unit of the present invention which is used as a display for electronic equipment, such as a mobile cellular telephone. The mobile cellular telephone shown in FIG. 8 is formed of an upper case 66 and a lower case 67. The upper case 66 has a transmitting/receiving antenna 68, a keyboard unit 69, and a microphone 72. The lower case 67 includes a liquid crystal display unit 1, such as the one shown in FIG. 1, a speaker 73, and a circuit board 74.

Figure 9:
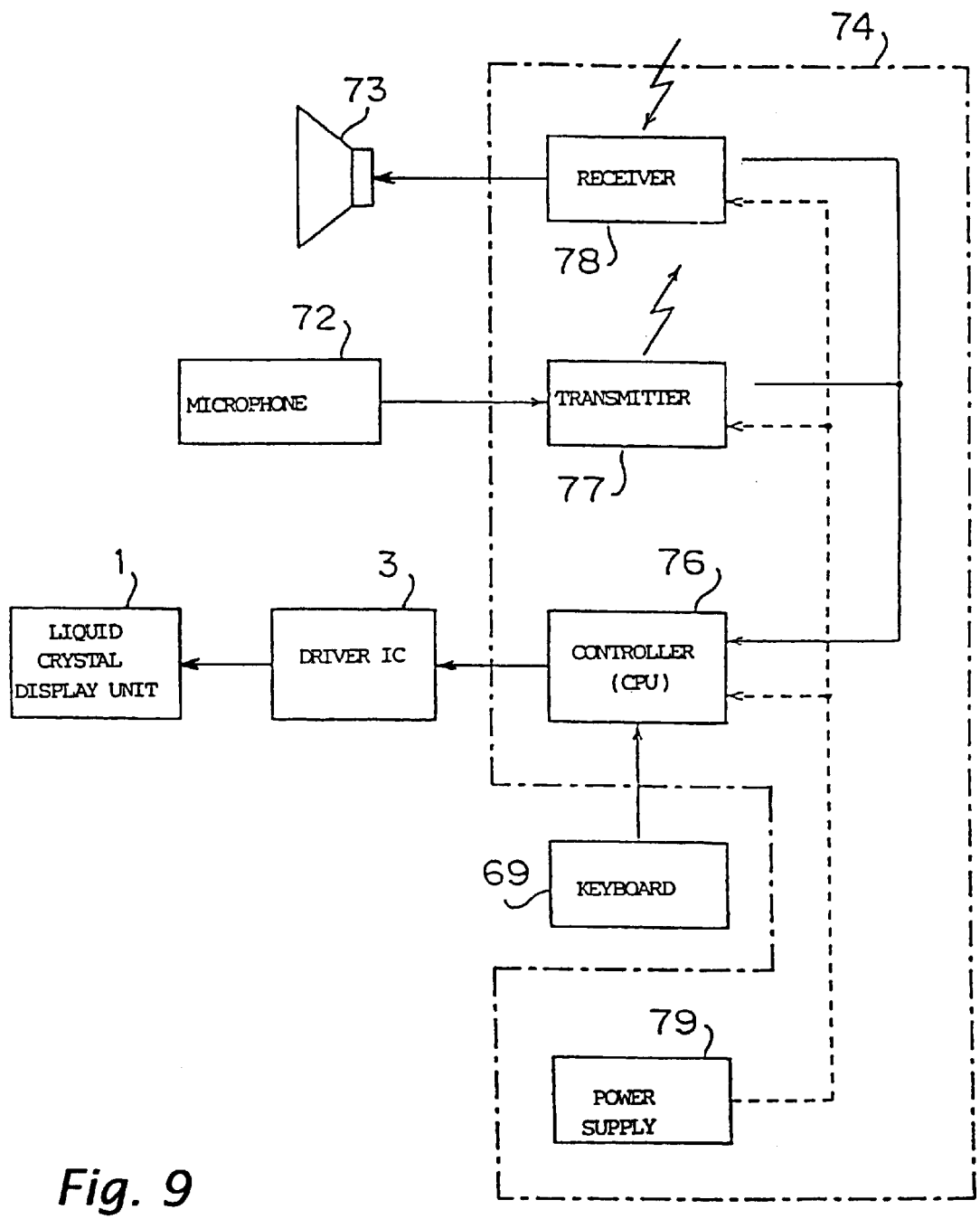
FIG. 9 is a block diagram illustrating an embodiment of an electrical control system applicable to the electronic equipment shown in FIG. 8.
Figure 10:
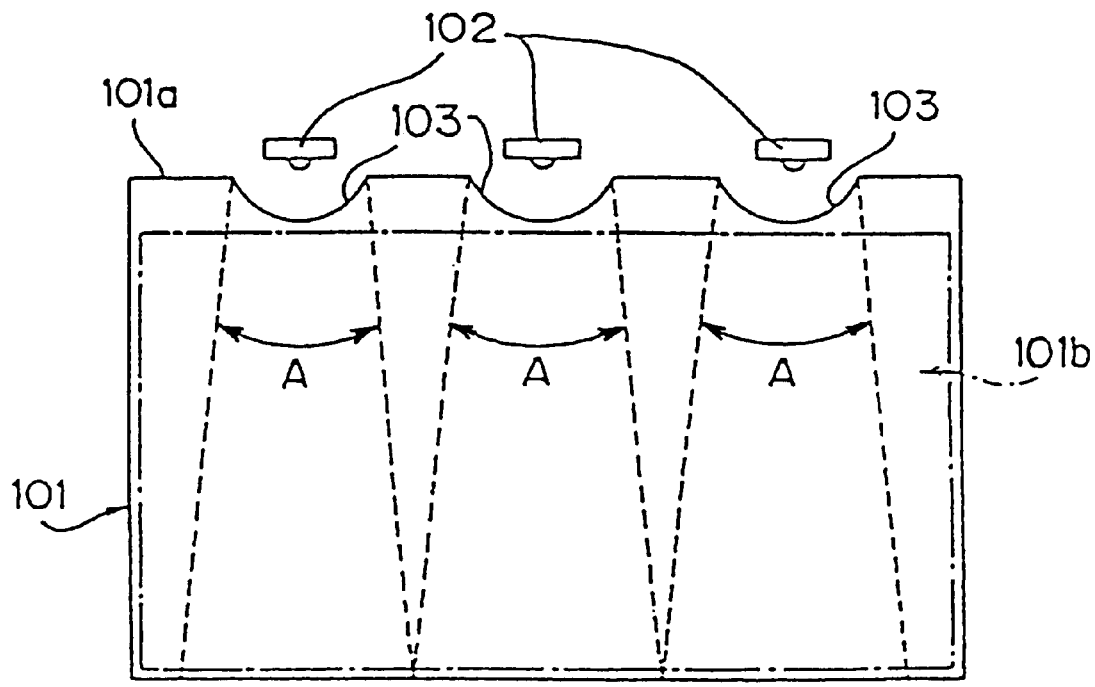
FIG. 10 is a plan view illustrating an example of known lighting devices.

Provided on the circuit board 74 are, as shown in FIG. 9, a receiver 78 connected to an input terminal of the speaker 73, a transmitter 77 connected to an output terminal of the microphone 72, a controller 76 having a CPU, and a power supply 79 for supplying power to the respective elements. The controller 76 reads the state of the transmitter 77 and the receiver 78 and, based on the state that was read, supplies the information to the driver IC 3, thereby displaying the visible information in the display area of the liquid crystal display unit 1. Further, the controller 76 supplies the information output from the keyboard unit 69 to the driver IC 3 and displays the visible information in the display area of the liquid crystal display unit 1.

While the present invention has been explained with reference to what are presently considered to be the preferred embodiments, it is to be understood that the invention is not limited to the disclosed embodiments. To the contrary, the invention is intended to be changed and modified within the spirit and scope of the appended claims.

For example, according to the lighting device of the present invention, the point-source lights are not limited to tungsten lamps, and light sources having any structure which exhibits characteristics of radiating point-like light, for example, an LED (light emitting diode), may be used.

According to the liquid crystal display unit of the present invention, a COG (Chip On Glass)-type liquid crystal panel is used by way of example in the embodiment shown in FIG. 1. The present invention may be, however, applied to a liquid crystal panel using a TCP (Tape Carrier Package), which is formed by a technique of TAB (Tape Automated Bonding), or other types of liquid crystal panels.

According to the electronic equipment of the present invention, the liquid crystal display unit of the present invention is used as the visible information display unit of a mobile cellular telephone by way of example in the embodiment shown in FIG. 8. The present invention may be applied to any electronic equipment other than mobile cellular telephones, for example, the visible information display area, which is referred to as "the view finder", of a video camera or a digital still camera.

According to the lighting device of the present invention, since the linear light rather than the point-like light is incident on the light incident surface of the planar light guide, the light having a uniform luminance level can be emitted from the overall light emitting surface of the planar light guide.

According to the lighting device of the present invention, different types of linear light guides and planar light guides are provided, and among such guides, suitable types may be selected and combined according to the need.

According to the lighting device of the present invention, the linear light guide and the planar light guide are integrally formed of one member. Thus, the lighting device is simple to construct, and the lighting device and the liquid crystal display unit are easy to assemble, and the management of parts is also easy.

According to the lighting device of the present invention, the linear light guide is easily constructed, and stable luminance characteristics of the linear light can be obtained.

According to the lighting device of the present invention, the light reflecting member of the linear light guide is easily configured, and stable light reflection characteristics can be achieved.

According to the lighting device of the present invention, since a large amount of light emitted from the point-source lights can be guided to the light reflecting member, the linear light having a high luminance level can be obtained on the light emitting surface of the linear light guide.

According to the liquid crystal display unit of the present invention and the electronic equipment of the present invention, the light emitted from the overall light emitting surface of the planar light guide has a uniform luminance level. Thus, it is possible to obtain a display having a uniform brightness level within the visible information display area of the liquid crystal panel.

What is claimed is:

1. A lighting device comprising:

a source for emitting point-like light;

a linear light guide disposed proximate said source for converting said point-like light into linear light and radiating same, the linear light guide including a light reflecting member for guiding the point-like light from said source to a light emitting surface of said linear light guide, said light reflecting member provided on a surface of said linear light guide other than said light emitting surface, the surface of said linear light guide on which said light reflecting member is provided being angled relative to said source of the point-like light and to said light emitting surface of said linear light guide;

a planar light guide for guiding the light from said linear light guide and radiating the guided light from a planar light emitting surface in a planar form; and wherein said light emitting surface of said linear light guide is opposite a light incident surface of said planar light guide, and is parallel to said light incident surface of said planar light guide.

2. A lighting device according to claim 1, wherein said light reflecting member comprises any one of a prism, a dot pattern having a light reflecting color, and a light reflecting sheet.

3. The lighting device of claim 2 wherein said linear light guide and said planar light guide are integral.

4. The lighting device of claim 3 wherein said source of the point-like light is positioned opposite a lateral surface of said linear light guide adjacent said light emitting surface.

5. The lighting device of claim 2 wherein said source of the point-like light is positioned opposite a lateral surface of said linear light guide adjacent said light emitting surface.

6. The lighting device of claim 1 wherein said linear light guide and said planar light guide are integral.

7. The lighting device of claim 6 wherein said source of the point-like light is positioned opposite a lateral surface of said linear light guide adjacent said light emitting surface.

8. The lighting device of claim 1 wherein said source of the point-like light is positioned opposite a lateral surface of said linear light guide adjacent said light emitting surface.

* * * * *